United States Patent
Hiltunen et al.

(10) Patent No.: US 10,989,837 B2
(45) Date of Patent: Apr. 27, 2021

(54) METHOD IN CONNECTION WITH A RADIOSONDE AND SYSTEM

(71) Applicant: Vaisala Oyj, Vantaa (FI)

(72) Inventors: Eero Hiltunen, Helsinki (FI); Lars Stormbom, Helsinki (FI); Petteri Survo, Helsinki (FI); Jukka Leppänen, Helsinki (FI)

(73) Assignee: Vaisala Oyj, Vantaa (FI)

( * ) Notice: Subject to any disclaimer, the term of this patent is extended or adjusted under 35 U.S.C. 154(b) by 521 days.

(21) Appl. No.: 15/838,411

(22) Filed: Dec. 12, 2017

(65) Prior Publication Data

US 2018/0180769 A1  Jun. 28, 2018

(30) Foreign Application Priority Data

Dec. 22, 2016 (FI) .................................... 20166011

(51) Int. Cl.
*G01W 1/06* (2006.01)
*G01W 1/08* (2006.01)
(Continued)

(52) U.S. Cl.
CPC ............ *G01W 1/08* (2013.01); *G01N 27/225* (2013.01); *G01W 1/06* (2013.01); *G01W 1/18* (2013.01)

(58) Field of Classification Search
CPC ........ G01N 27/225; G01W 1/18; G01W 1/06; G01W 1/08
See application file for complete search history.

(56) References Cited

U.S. PATENT DOCUMENTS 3,802,268 A    4/1974 Thoma
5,270,929 A *  12/1993 Paulson .................. G01S 17/95
                                                            702/3
(Continued)

FOREIGN PATENT DOCUMENTS

CN    1882854 A    12/2006
CN  104252010 A    12/2014
(Continued)

OTHER PUBLICATIONS

Luijten et al: Pressure influence in capacitive humidity measurement. Sensors and Actuators B: Chemical: International Journal Devoted to Research ANS Development of Physical and Chemical Transcucers, Jan. 7, 1998. vol. 49, No. 3, pp. 279-282. XP0041420983.
(Continued)

*Primary Examiner* — Yoshihisa Ishizuka
(74) *Attorney, Agent, or Firm* — Laine IP Oy

(57) ABSTRACT

According to an example aspect of the present invention, there is provided a method in connection with a radiosonde, the method comprising measuring a humidity of the atmosphere at several different altitudes in the atmosphere, measuring a pressure at several different altitudes in the atmosphere or calculating the pressure from an altitude of the radiosonde obtained from GPS or other satellite navigation system, measuring or estimating a temperature of a humidity sensor, and measuring a relative humidity by a capacitor with a polymer insulator, wherein the relative humidity value is corrected based on a correction factor, which is a function of pressure, humidity sensor temperature, and relative humidity, such that the humidity value decreases when pressure decreases.

15 Claims, 4 Drawing Sheets

(51) Int. Cl.
*G01N 27/22* (2006.01)
*G01W 1/18* (2006.01)

(56) References Cited

U.S. PATENT DOCUMENTS

| | | | |
|---|---|---|---|
| 5,511,417 A * | 4/1996 | Paukkunen | G01N 25/56 73/29.01 |
| 7,358,862 B2 | 4/2008 | Andersson et al. | |
| 2008/0072669 A1 | 3/2008 | Paukkunen | |
| 2015/0094976 A1 * | 4/2015 | Cooper | G01L 27/002 702/98 |
| 2018/0038994 A1 * | 2/2018 | Hamann | G01W 1/10 |

FOREIGN PATENT DOCUMENTS

| | | |
|---|---|---|
| EP | 0645620 A2 | 3/1995 |
| JP | 3787779 B2 | 6/2006 |
| KR | 101508558 B1 | 4/2015 |
| KR | 101653109 B1 | 9/2016 |
| WO | WO 2014128348 A1 | 8/2014 |

OTHER PUBLICATIONS

Miloshevich et al: Characterization and correction of relative humidity measurements from Vaisala RS80-A radiosondes at cold temperatures. Journal of Atmospheric and Oceanic Technology Jan. 2, 2001. vol. 18, No. 2. pp. 135-156. XP055467006.

Stauffer et al: Propagation of radiosonde pressure sensor errors to ozonesonde measurements. Atmospheric Measurement Techniques, Oct. 1, 2014. vol. 7, pp. 65-79.

Guide to meteorological instruments and methods of observation. WMO, 2014, 8th edition, Chapters 4 & 12.

Kämpfer et al: Monitoring atmospheric water vapour—Ground-based remote sensing and in-situ methods. ISSI Scientific Report Series Book 10, 2013 edition, Springer, Nov. 9, 2012, Part 1& 2 (Smit et al), pp. 11-21.

* cited by examiner

METHOD IN CONNECTION WITH A RADIOSONDE AND SYSTEM

FIELD

Aspects of the present invention relate to a method in connection with a radiosonde. In particular, aspects of the invention relate to error compensation for humidity measurement in a radiosonde. Further, aspects of the invention relate to a system comprising a radiosonde and a ground station. Furthermore, aspects of the invention relate to a computer readable medium having stored thereon a set of computer implementable instructions. Additionally, aspects of the invention relate to a computer program.

BACKGROUND

A radiosonde is a weather observation device, which is attached to a gas balloon, measures atmospheric parameters, and sends the measurement information typically to a ground station. Measured or calculated parameters typically include ambient temperature, pressure, and humidity, as well wind speed and direction, at various altitudes.

The radiosonde is carried upwards through the atmosphere by a gas balloon, whereby the atmosphere to be measured and also the environmental conditions of the measurement arrangement change dynamically. Certain embodiments of the invention are also suitable for dropsondes. A dropsonde is a weather observation device like a radiosonde, but instead of being lifted by a gas balloon it is dropped from an airborne system, typically an aircraft, Unmanned Aircraft System (UAS), or a driftballoon.

Meteorological measurements are performed by the sensors of the radiosonde. The atmospheric profile obtained by a radiosonde is particularly important as input for numerical weather forecasting models and climate research. There are also military radiosonde applications e.g. for weather forecasting and ballistic preparation.

U.S. Pat. No. 7,358,862 B2 discloses, for example, a radiosonde system, a radiosonde system receiver and a signal processing method for use in a radiosonde system. The radiosonde system comprises at least one radiosonde with means for acquisition of position and/or weather data and means for downstream transmission of the data over a radio-frequency path, signal capture means for reception of the weather and/or position data, and receiver means for processing the received signals.

One of the key parameters to be measured by radiosondes is the water vapour concentration, measured either as relative humidity, or as dew point temperature. One of the objectives of this humidity measurement is, for example, detection of clouds and their altitude. Typically, the temperature range during the measurement cycle is very large and may be, for example, in the range between +40[° C.] and −80[° C.].

The measurements may be complicated by, inter alia, the large range of each measured variable, and rain, temperature, freezing, condensation, and oversaturation. Measuring errors may also be caused by slowness of the radiosonde sensors, and by radiative heat exchange occurring in the atmosphere.

Recent developments in climate research and in traditional weather forecasting have set even more strict accuracy requirements for humidity measurements. Low temperature combined with low water vapour concentration in the stratosphere, or high water vapour concentration in the upper troposphere make the measuring environment extremely challenging. Humidity also varies quickly in relation to time and altitude.

Document US 2008/0072669 A1 describes a method for correcting humidity measurement results of a radiosonde for errors resulting from radiative heat exchange. Humidity is measured by the humidity sensor in the radiosonde. An error correction table or function is used to estimate the error caused by radiative heat exchange as a function of one or more parameters affecting sensor heat balance, such as solar radiation intensity, solar elevation angle, balloon ascent rate, and air density. Alternatively, a correction table or correction function is used to estimate the temperature of the humidity sensor, and a corrected humidity value is calculated based on both the measured humidity and the estimated humidity sensor temperature.

Document WO 20 14/128348 A1 discloses a method and a radiosonde. According to the method, at least temperature and relative humidity of the atmosphere are measured by a radiosonde. The humidity measurement is performed continuously in an elevated temperature in order to make the measurement faster, and both the elevated temperature and the ambient air temperature are measured simultaneously. These three measurements are used to determine the corrected atmospheric humidity. This method eliminates the need for radiation error correction presented in document US 2008/0072669 A1.

In radiosondes the most commonly used humidity sensor type is a capacitive thin film sensor. The signal of a capacitive humidity sensors changes as water is absorbed into the insulating polymer film changing the permittivity of the polymer. The amount of water absorbed is approximately proportional to the relative humidity at the temperature of the sensor, i.e., to the proportion of the partial pressure of water vapor to the sensor temperature dependent saturation vapor pressure. In a molecular scale, the amount of water absorbed into the polymer depends on the amount of suitable binding sites available for water molecules which depends also on the amount of other gases absorbed into the polymer. Therefore, at a given partial pressure of water vapor, water absorption into a given polymer is dependent on sensor temperature, gas pressure, and gas composition. In the rest of this document, the error caused by ignoring some of the dependencies is called absorption model error.

As part of the radiosonde manufacturing process each radiosonde sensor is individually characterized for measurement errors. For cost reasons, the error characterization is typically made near normal pressure, i.e. 1013.15 [hPa], at different temperatures. Due to the characterization conditions the absorption model error is typically reduced to an insignificant level at the relevant temperature range near normal pressure.

Furthermore, in air at room temperature the absorption model error is typically insignificantly small at pressure range from normal pressure to full vacuum. This explains why the absorption model error of humidity measurement has been undetected in radiosondes.

However, measurements in low pressure conditions indicate that the absorption model error of a capacitive polymer based sensors grows rapidly at low temperatures, becoming noticeable below −20[° C.] and significant at the lower end of radiosonde temperature range at between about −60[° C.] and −80[° C.]. Corrections larger than 0.5 [% RH] can be considered relevant in radiosounding data.

Carrying out individual radiosonde error characterization for the humidity measurement at low pressures and temperatures is however extremely time consuming and expensive.

Therefore, there is need for an error compensation for humidity measurement which takes in account the low pressure and temperature encountered during sounding.

SUMMARY OF THE INVENTION

The invention is defined by the features of the independent claims. Some specific embodiments are defined in the dependent claims.

One object of certain embodiments of the present invention is to provide a method and system for correcting the humidity measurement results of a radiosonde. In particular, an object of certain embodiments of the present invention is to provide an absorption model error compensation method and system for humidity measurement in radiosondes. Further, an object of certain embodiments of the present invention is to provide a method in connection with a radiosonde, which method comprises steps for measuring at least pressure and humidity of the atmosphere at several altitudes, measuring the humidity sensor temperature, and measuring relative humidity by a capacitor having a polymer insulator. Furthermore, an object of certain embodiments of the present invention is to provide a system comprising a radiosonde and a ground station. Additionally, an object of certain embodiments of the present invention is to provide a computer readable medium having stored thereon a set of computer implementable instructions. One object of certain embodiments of the present invention is to provide a computer program.

According to a first aspect of the present invention, there is provided a method in connection with a radiosonde, the method comprising measuring a humidity of the atmosphere at several different altitudes in the atmosphere, measuring a pressure at several different altitudes in the atmosphere or calculating the pressure from an altitude of the radiosonde obtained from GPS or other satellite navigation system, measuring or estimating a temperature of a humidity sensor, and measuring the relative humidity by a capacitor with a polymer insulator, determining a correction factor based at least partly on the pressure, the humidity sensor temperature, and the relative humidity, and correcting the relative humidity value based on the correction factor such that the humidity value decreases when pressure decreases.

Various embodiments of the first aspect may comprise at least one feature from the following bulleted list:
- an obtained corrected humidity value is used either directly in the radiosonde or it is communicated to a ground station where it is used.
- humidity sensor temperature is either measured or estimated from the ambient temperature
- the measurement results are transmitted to a ground station and the relative humidity value correction is made for the signal received at the ground station
- the correction is based on the following formulas:

$$RH\_final = RH - RH\_correction(P,T,RH)$$

$$RH\_correction(P,T,RH) = \Sigma_{i=0}^{3} p_i * \Sigma_{k=0}^{3} c_{ik} * T^k * RH^i$$

$$p_i = b_i*(P/P0)/(1+b_i*(P/P0)) - b_i/(1+b_i),$$

where
RH is measured relative humidity before correction [%]

RH_correction is correction for pressure and temperature induced error [%]

P is pressure [hPa]

P0 is normal air pressure, i.e. 1013.2 [hPa]

T is estimated or measured humidity sensor temperature [° C.]

$c_{ik}$ and $b_1$ are polymer-specific parameters, with indices i and k running from 0 to 3, determined through measurements against calibrated references.

- a volume resistivity of the polymer used is in a range between $1.0*10^6$ [Ohm/m] and $1.0*10^{18}$ [Ohm/m]
- a relative permittivity of the polymer used is in a range between 2 and 6
- a relative change of the sensor capacitance is in a range between 5 [%] and 50 [%] as the sensor is exposed to a step change of relative humidity from 0 [RH %] to 100 [RH %]
- humidity sensor temperature is in a range between −100 [° C.] and 50 [° C.]
- correction of the relative humidity is performed at altitudes greater than 15000 [m], 16000 [m], 17000 [m], 18000 [m], 19000 [m], 20000 [m], 25000 [m], or 30000 [m] above sea level
- correcting the relative humidity value is performed during measuring of the humidity or at a later stage, e.g. based on archived data
- the correction factor (RH_correction) is a function of only pressure, humidity sensor temperature, and relative humidity According to a second aspect of the present invention, there is provided a system comprising a radiosonde and a ground station, and wherein the radiosonde comprises means for measuring a relative humidity (e.g. a humidity sensor), the radiosonde comprises means for measuring a pressure (e.g. a pressure sensor) or the system comprises means for calculating the pressure (e.g. a computing device) from an altitude of the radiosonde obtained from GPS or other satellite navigation system, the radiosonde comprises a capacitor with a polymer insulator, the system comprises means for measuring (e.g. a temperature sensor) or estimating (e.g. a computing device) a temperature of a humidity sensor, and wherein the system is configured to correct a relative humidity value based on a correction factor, which is a function of the pressure, humidity sensor temperature, and relative humidity, such that the humidity value decreases when pressure decreases.

Various embodiments of the second aspect may comprise at least one feature corresponding to a feature from the preceding bulleted list laid out in connection with the first aspect.

According to a third aspect of the present invention, there is provided a computer readable medium having stored thereon a set of computer implementable instructions capable of causing a processor, in connection with a radiosonde or a ground station, to correct a measured relative humidity value based on a correction factor, which is a function of the pressure, humidity sensor temperature, and relative humidity, such that the humidity value decreases when pressure decreases.

Various embodiments of the third aspect may comprise at least one feature corresponding to a feature from the preceding bulleted list laid out in connection with the first aspect.

According to a fourth aspect of the present invention, there is provided a computer program configured to cause a method in accordance with the first aspect to be performed.

Various embodiments of the fourth aspect may comprise at least one feature corresponding to a feature from the preceding bulleted list laid out in connection with the first aspect.

Considerable advantages are obtained by means of the embodiments of the invention. Certain embodiments of the invention provide a method and system for correcting the humidity measurement results of a radiosonde. The measured humidity value can be compensated with a function depending on measured humidity, humidity sensor temperature and pressure.

The needed absorption model error compensation is a material property of the polymer material used in the humidity sensor. The measured relative humidity can be compensated with a standard function that does not depend on measurements carried out for individual radiosondes at low pressure and low temperature.

The measurement errors caused by absorption model error are large, up to 10 [% RH] at −80 [° C.]. As conditions during sounding are variable, the introduction of explicit absorption model error compensation improves measurement accuracy and consistency. Frequently occurring erroneous oversaturation humidity readings in tropopause on tropic latitude can be eliminated by using this compensation. Some persistent errors such as high bias after tropopause are also explained by this phenomenon and can be eliminated as well.

EMBODIMENTS

Certain embodiments of the present invention relate to a method in connection with a radiosonde, which method comprises steps for measuring at least pressure and humidity of the atmosphere at several altitudes, measuring or estimating a temperature of the humidity sensor, and measuring relative humidity by a capacitor having a polymer insulator, and wherein the relative humidity value is corrected based on a correction factor, which is a function of pressure, humidity sensor temperature and relative humidity such that the humidity value decreases when pressure decreases. By means of the embodiments of the invention, error caused by low pressure and low temperature can be corrected.

Figure 1:
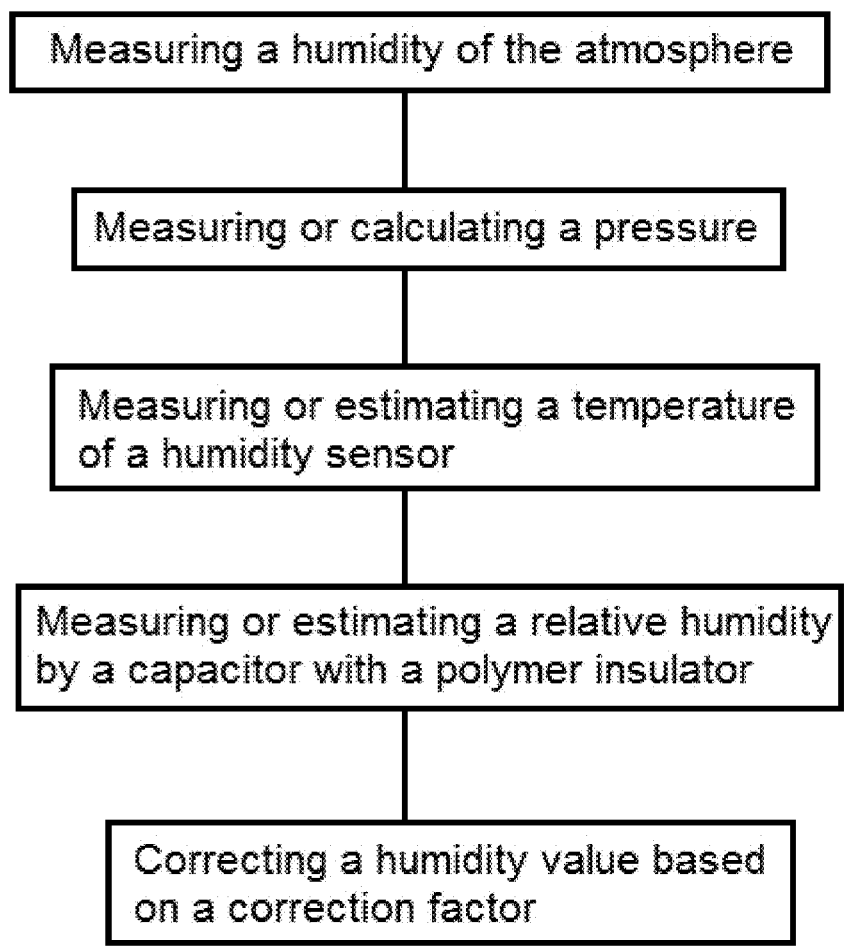
FIG. 1 illustrates a flow chart of the method in accordance with at least some embodiments of the present invention.

In FIG. 1 a flow chart of the method according to an embodiment of the present invention is illustrated. The method in connection with a radiosonde comprises measuring a humidity of the atmosphere at several different altitudes in the atmosphere. Further, the method comprises measuring a pressure at several different altitudes in the atmosphere. Alternatively, the pressure may be estimated from an altitude of the radiosonde. For example, the pressure may be calculated from an altitude (i.e. a height) of the radiosonde obtained from GPS or other satellite navigation system. Furthermore, the method comprises measuring or estimating a temperature of a humidity sensor. Additionally, the method comprises measuring a relative humidity by a capacitor with a polymer insulator. According to the method, a correction factor is determined based at least partly or only on the pressure, the humidity sensor temperature, and the relative humidity. Correcting the relative humidity value is performed based on the correction factor such that the humidity value decreases when pressure decreases. The obtained corrected humidity value may be used either directly in the radiosonde or may be communicated to a ground station where it is used.

According to a certain embodiment, a volume resistivity of the polymer used is advantageously in a range between $1.0*10^6$ [Ohm/m] and $1.0*10^{18}$ [Ohm/m], a relative permittivity of the polymer used is advantageously in a range between 2 and 6, and a relative change of the sensor capacitance is in a range between 5 [%] and 50 [%] as the sensor is exposed to a step change of relative humidity from 0 [RH %] to 100 [RH %].

Figure 2:
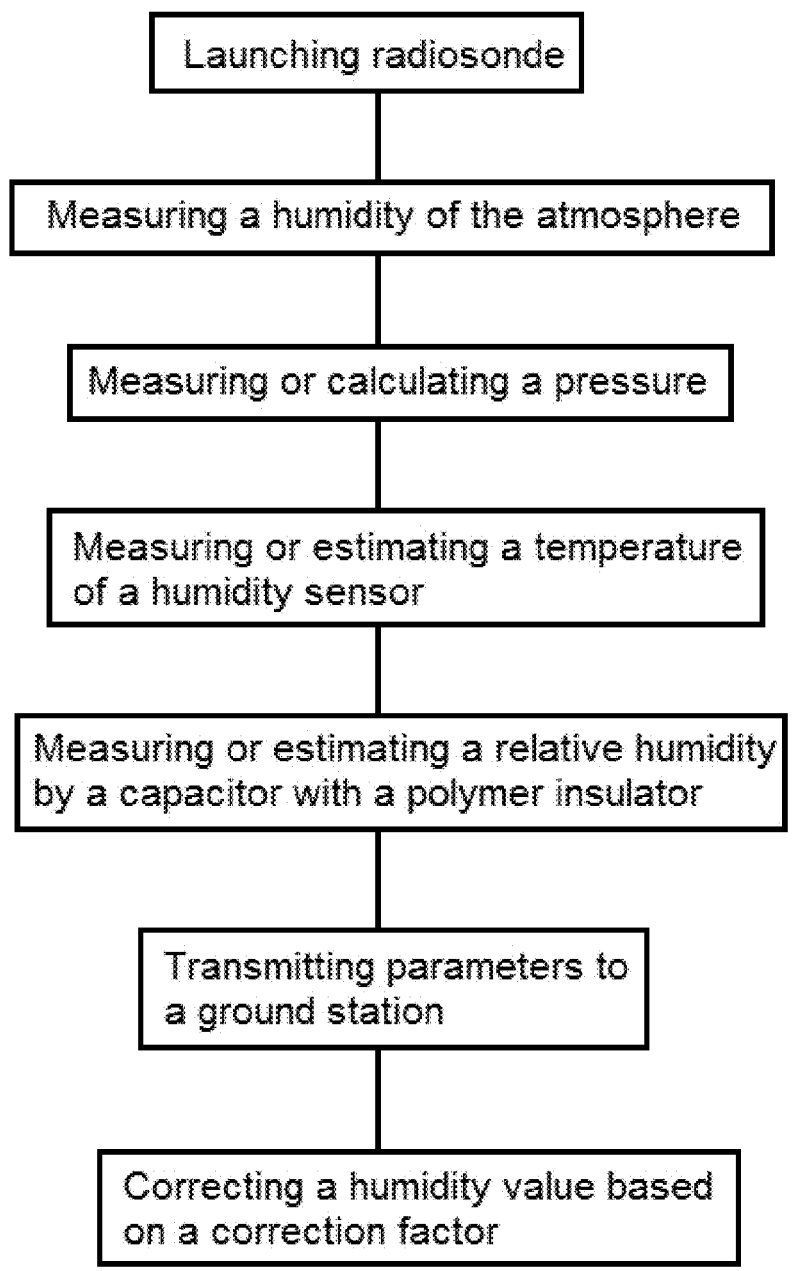
FIG. 2 illustrates a flow chart of the method in accordance with at least some embodiments of the present invention.

In FIG. 2 a flow chart of the method according to another embodiment of the present invention is illustrated. After launching a radiosonde, at least a humidity of the atmosphere and a humidity sensor temperature are measured at several different altitudes in the atmosphere. Additionally, a pressure is measured at several different altitudes in the atmosphere or calculated from an altitude of the radiosonde. In the latter case, the pressure may be considered as GPS-altitude derived pressure. Further, the relative humidity is measured by a capacitor having a polymer insulator. Subsequently, the measurement results are transmitted to a ground station and the relative humidity value correction is made for the signal received at the ground station.

According to certain embodiments, post processing of radiosounding data may take place by using a computing device such as a regular workstation computer. Generally, processing of data may be also performed for archived data.

Figure 3:
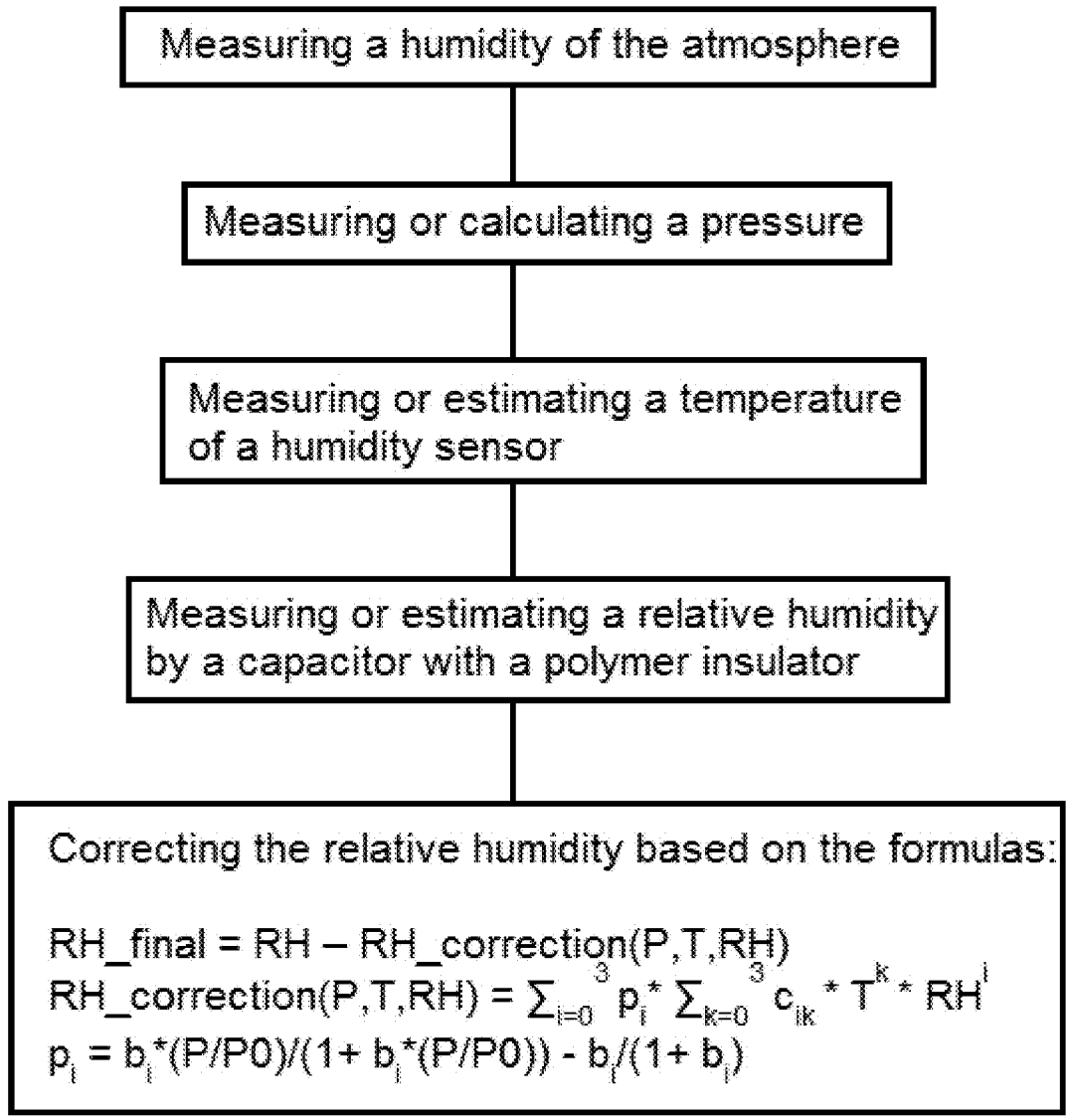
FIG. 3 illustrates a flow chart of the method in accordance with at least some embodiments of the present invention.

In FIG. 3 a flow chart of the method according to an embodiment of the present invention is illustrated. The method in connection with a radiosonde comprises measuring a humidity of the atmosphere at several different altitudes in the atmosphere. Further, the method comprises measuring a pressure at several different altitudes in the atmosphere. Alternatively, the pressure may be estimated from an altitude of the radiosonde. For example, the pressure may be calculated from an altitude of the radiosonde obtained from GPS or other satellite navigation system. Furthermore, the method comprises measuring or estimating a temperature of a humidity sensor. Additionally, the method comprises measuring a relative humidity by a capacitor with a polymer insulator. The relative humidity value (RH) is corrected based on a correction factor (RH_correction), which is a function of pressure, humidity sensor temperature, and relative humidity, such that the humidity value decreases when pressure decreases.

The correction is based on the following formulas:

$$RH\_final = RH - RH\_correction(P, T, RH)$$

$$RH\_correction(P, T, RH) = \Sigma_{i=0}^{3} p_i * \Sigma_{k=0}^{3} c_{ik} * T^k * RH^i$$

$$p_i = b_i * (P/P0)/(1 + b_i * (P/P0)) - b_i/(1 + b_i),$$

where
RH is measured relative humidity before correction [%]
RH_correction is correction for pressure and temperature induced error [%]
P is pressure [hPa]
P0 is normal air pressure, i.e. 1013.2 [hPa]

T is estimated or measured humidity sensor temperature [° C.]

$c_{ik}$ and $b_i$ are polymer-specific parameters, with indices i and k running from 0 to 3, determined through measurements against calibrated references.

According to certain embodiments, the correction formulas given above can be modified for dewpoint for polymer sensors with dewpoint calibration using laws of physics.

Correction takes place at a pressure below normal air pressure. Correction of the relative humidity value (RH) may take place in the radiosonde or at a ground station after transmitting the measurement results to the ground station. Typically, at least one of the radiosonde and the ground station comprises a computer readable medium having stored thereon a set of computer implementable instructions capable of causing a processor, in connection with the radiosonde or the ground station, to correct the measured relative humidity value. Alternatively, post processing of data may take place by a computing device.

Figure 4:
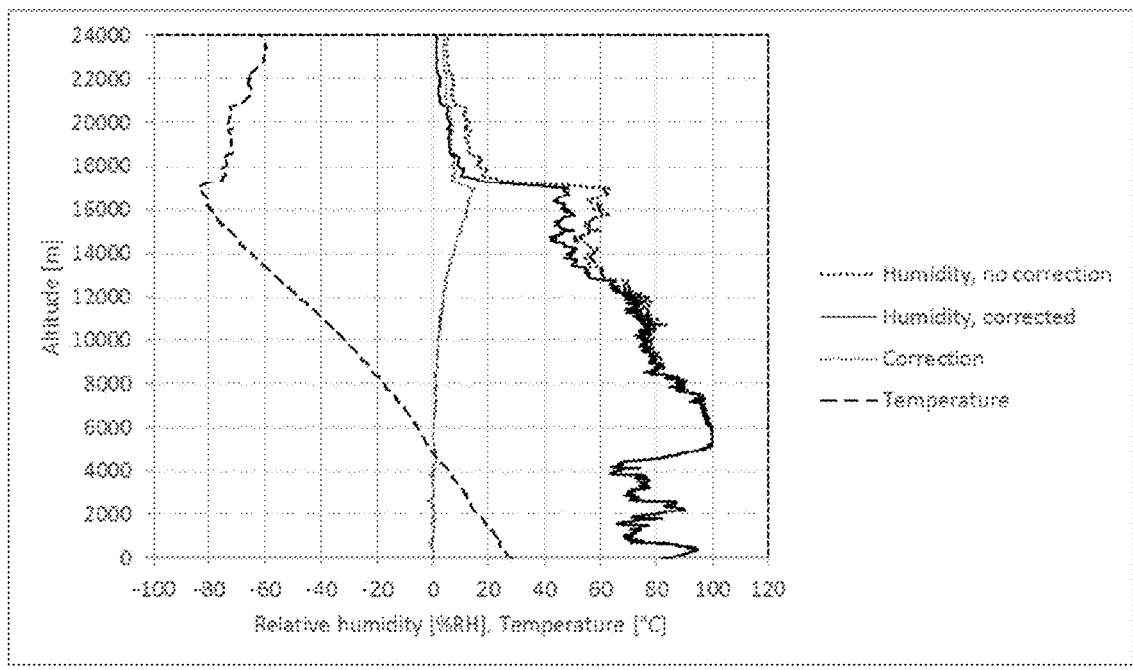
FIG. 4 illustrates a first diagram showing the temperature and relative humidity at different altitudes.

In FIG. 4 a first diagram showing the temperature and relative humidity at different altitudes is illustrated. In the diagram the temperature, the measured relative humidity, the corrected relative humidity, and the difference between the measured relative humidity and the corrected relative humidity are shown. It can be clearly seen that a maximum measurement error occurs in the range between 16000 [m] and 18000 [m] above the sea level.

Figure 5:
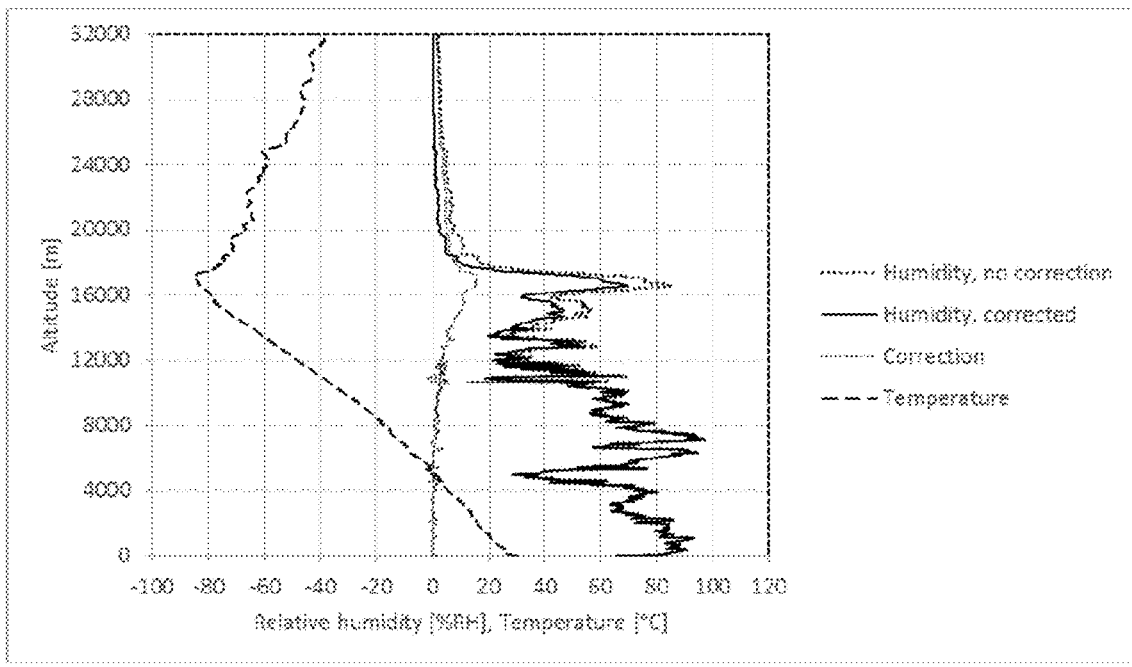
FIG. 5 illustrates a second diagram showing the temperature and relative humidity at different altitudes.

FIG. 5 illustrates a second diagram showing the temperature and relative humidity at different altitudes. In the diagram the temperature, the measured relative humidity, the corrected relative humidity, and the difference between the measured relative humidity and the corrected relative humidity are shown. It can be clearly seen that a maximum measurement error occurs in the range between 15000 [m] and 20000 [m] above the sea level at the lowest measured temperature.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In this description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

INDUSTRIAL APPLICABILITY

At least some embodiments of the present invention find industrial application in radiosondes and humidity measurement methods.

CITATION LIST

Patent Literature
U.S. Pat. No. 7,358,862 B2
US 2008/0072669 A1
WO 2014/128348 A1

The invention claimed is:

1. A method in connection with a radiosonde, the method comprising:

measuring a humidity of an atmosphere at a plurality of different altitudes in the atmosphere by a capacitor with a polymer insulator, measuring a pressure at the plurality of different altitudes in the atmosphere or calculating the pressure from an altitude of the radiosonde obtained from a satellite navigation system, measuring or estimating a temperature of a humidity sensor, and providing a material dependent relative humidity error compensation by correcting a relative humidity value (RH) based on a correction factor (RH_correction) such that the relative humidity value decreases when pressure decreases, wherein the correction factor is a function of pressure, humidity sensor temperature, and relative humidity, and wherein the correction factor is based on the following formulas:

$$RH\_final = RH - RH\_correction(P,T,RH)$$

$$RH\_correction(P,T,RH)=\Sigma_{i=0}^{3}p_i*\Sigma_{k=0}^{3}c_{ik}*T^k*RH^i$$

$$p_i=b_i*(P/P0)/(1+b_i*(P/P0))-b_i/(1+b_i),$$

where

RH_final is a corrected humidity value [%]
RH is measured relative humidity before correction [%]
RH_correction is correction for pressure and temperature induced error [%]
P is pressure [hPa]
P0 is normal air pressure
T is estimated or measured humidity sensor temperature [° C.]
$c_{ik}$ and $b_i$ are polymer-specific parameters, with indices i and k running from 0 to 3,
determined through measurements against calibrated references.

2. The method according to claim 1, wherein an obtained corrected relative humidity value (RH_final) is used either directly in the radiosonde or the obtained corrected relative humidity value (RH_final) is communicated to a ground station where the obtained corrected relative humidity value is used.

3. The method according to claim 1, wherein the humidity sensor temperature is either measured or estimated from the ambient temperature.

4. The method according to claim 1, wherein a volume resistivity of a polymer of the polymer insulator used is in a range between $1.0*10^6$ [Ohm/m] and $1.0*10^{18}$ [Ohm/m].

5. The method according to claim 1, wherein a relative permittivity of a polymer of the polymer insulator used is in a range between 2 and 6.

6. The method according to claim 1, wherein a relative change of a sensor capacitance is in a range between 5 [%] and 50 [%] as the sensor is exposed to a step change of relative humidity from 0 [RH %] to 100 [RH %].

7. The method according to claim 1, wherein a humidity sensor temperature is in a range between −100 [° C.] and 50 [° C.].

8. A system comprising:
a radiosonde and a ground station, and wherein the radiosonde comprises a capacitor with a polymer insulator for measuring a relative humidity,
wherein the radiosonde is configured to measure a pressure or the system is configured to calculate the pressure from an altitude of the radiosonde obtained from a satellite navigation system,
wherein the system is configured to measure or estimate a temperature of a humidity sensor, and wherein
the system is configured to provide a material dependent relative humidity error compensation by correcting a relative humidity value (RH) based on a correction factor (RHcorrection) such that the relative humidity value decreases when pressure decreases, wherein the correction factor is a function of the pressure, humidity sensor temperature, and relative humidity, wherein the correction is based on the following formulas:

$$RH\_final=RH-RH\_correction(P,T,RH)$$

$$RH\_correction(P,T,RH)=\Sigma_{i=0}^{3}p_i*\Sigma_{k=0}^{3}c_{ik}*T^k*RH^i$$

$$p_i=b_i*(P/P0)/(1+b_i*(P/P0))-b_i/(1+b_i),$$

where

RH_final is a corrected humidity value [%]
RH is measured relative humidity before correction [%]
RH_correction is correction for pressure and temperature induced error [%]
P is pressure [hPa]
P0 is normal air pressure
T is estimated or measured humidity sensor temperature [° C.]
$c_{ik}$ and $b_i$ are polymer-specific parameters, with indices i and k running from 0 to 3, determined through measurements against calibrated references.

9. The system according to claim 8, wherein the system is configured to measure or estimate the humidity sensor temperature from the ambient temperature.

10. The system according to claim 8, wherein the radiosonde is configured to transmit measurement results or the corrected relative humidity value or the correction factor to the ground station.

11. The system according to claim 8, wherein a volume resistivity of a polymer of the polymer insulator used is in a range between $1.0*10^6$ [Ohm/m] and $1.0*10^{18}$ [Ohm/m].

12. The system according to claim 8, wherein a relative permittivity of a polymer of the polymer insulator used is in a range between 2 and 6.

13. The system according to claim 8, wherein a relative change of a sensor capacitance is in a range between 5 [%] and 50 [%] as the sensor is exposed to a step change of relative humidity from 0 [RH %] to 100 [RH %].

14. The system according to claim 8, wherein the system is configured to operate in a temperature range between −100 [° C.] and 50 [° C.] or a sub-range thereof.

15. A non-transitory computer readable medium having stored thereon a set of computer implementable instructions capable of causing a processor, in connection with a radiosonde or a ground station of a radiosonde, at least to:
provide a material dependent relative humidity error compensation by correcting a measured relative humidity value (RH) based on a correction factor (RH_correction) such that the relative humidity value decreases when pressure decreases, wherein the correction factor is a function of the pressure, humidity sensor temperature, and relative humidity, wherein the correction is based on the following formulas:

$$RH\_final=RH-RH\_correction(P,T,RH)$$

$$RH\_correction(P,T,RH)=\Sigma_{i=0}^{3}p_i*\Sigma_{k=0}^{3}c_{ik}*T^k*RH^i$$

$$p_i=b_i*(P/P0)/(1+b_i*(P/P0))-b_i/(1+b_i),$$

where
RH_final is a corrected humidity value [%]
RH is measured relative humidity before correction [%],
RH_correction is correction for pressure and temperature induced error [%]
P is pressure [hPa]
P0 is normal air pressure
T is estimated or measured humidity sensor temperature [° C.]
$c_{ik}$ and $b_i$ are polymer-specific parameters, with indices i and k running from 0 to 3, determined through measurements against calibrated references.

* * * * *